(12) United States Patent
Nied et al.

(10) Patent No.: US 6,433,912 B1
(45) Date of Patent: Aug. 13, 2002

(54) FLAT CHAMBER FOR FILLING WITH FLUID MEDIA

(75) Inventors: Heiko Nied, Bergisch Gladbach; Martin Kling; Horst Berneth, both of Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/554,385

(22) PCT Filed: Nov. 4, 1998

(86) PCT No.: PCT/EP98/07029

§ 371 (c)(1),
(2), (4) Date: May 12, 2000

(87) PCT Pub. No.: WO99/26108

PCT Pub. Date: May 27, 1999

(30) Foreign Application Priority Data

Nov. 14, 1997 (DE) .......................... 197 50 404

(51) Int. Cl.⁷ .......................... G02F 1/03; G02F 1/153; G02F 1/1339; G02B 26/00
(52) U.S. Cl. ...................... 359/253; 359/254; 359/272; 359/296; 349/153; 349/154
(58) Field of Search .................. 29/592.1; 204/403, 204/409; 250/343; 349/153, 154, 187, 189; 359/253, 254, 272, 296

(56) References Cited

U.S. PATENT DOCUMENTS

| | | | |
|---|---|---|---|
| 3,451,741 A | 6/1969 | Manos | 359/275 |
| 3,806,229 A | 4/1974 | Schoot et al. | 359/273 |
| 3,834,791 A | 9/1974 | Raimbault | 349/154 |
| 4,036,551 A | 7/1977 | Mori | 359/273 |
| 4,761,061 A | 8/1988 | Nishiyama et al. | 359/265 |
| 4,820,025 A * | 4/1989 | Nakanowatari | 349/154 |
| 5,233,461 A | 8/1993 | Dorman et al. | 359/272 |
| 5,785,718 A | 7/1998 | Berneth et al. | 8/437 |
| 5,838,482 A * | 11/1998 | Decroupet et al. | 359/253 |

FOREIGN PATENT DOCUMENTS

| | | | |
|---|---|---|---|
| DE | 196 05 448 A1 | 8/1997 | G02F/1/15 |
| DE | 196 05 451 A1 | 8/1997 | G02F/1/15 |
| DE | 196 31 729 A1 | 2/1998 | C09K/9/02 |
| EP | 0 000 109 A | 12/1978 | G02F/1/01 |
| EP | 0 240 226 A2 | 10/1987 | G02F/1/17 |
| EP | 0 435 689 A2 | 12/1990 | C09K/9/02 |
| EP | 0 613 039 A2 | 8/1994 | G02F/1/15 |
| GB | 2 004 080 A | 3/1979 | G02F/1/17 |
| WO | 94/23333 A1 | 10/1994 | G02F/1/15 |
| WO | 95/32450 A1 | 11/1995 | G02F/1/17 |
| WO | 99/26108 | 5/1999 | |

OTHER PUBLICATIONS

Patent Abstracts of Japan, vol. 010, No. 052, dated Feb. 28, 1986 & JP 60 195525 A (Hitachi Maxell KK), published Oct. 4, 1985.

Patent Abstracts of Japan, vol. 010, No. 052, dated Feb. 28, 1986 –& JP 60 195525 A (Hitachi Maxell) dated Oct. 4, 1985.

* cited by examiner

*Primary Examiner*—Georgia Epps
*Assistant Examiner*—David N. Spector
(74) *Attorney, Agent, or Firm*—Norris McLaughlin & Marcus

(57) ABSTRACT

Flat chamber for filling with fluid media which is defined by two essentially parallel limiting plates and a circumferential bead of a cured, impermeable adhesive between the plates which bonds the plates to one another, where at least one capillary is provided which runs parallel to the plates, passes through the adhesive bead and is bonded thereto.

4 Claims, 2 Drawing Sheets

FLAT CHAMBER FOR FILLING WITH FLUID MEDIA

BACKGROUND OF THE INVENTION

The present invention relates to a flat chamber for filling with fluid media which is defined by two essentially parallel limiting plates and a circumferential bead of a cured, impermeable adhesive between the plates which bonds the plates to one another.

Chambers of this type, whose plate separation can be, for example, from 0.1 to 1 mm and in which the area extent of the plates can be between fractions of a cm$^2$ and several dm$^2$, are used as functional containers for liquids which change their properties, in particular their optical properties, such as colour, absorption capacity, optical activity, etc., under the action of external influences, such as electric or magnetic fields, temperature, radiation, etc. Correspondingly, at least one of the limiting plates is designed to be optically transparent if the desired effect is observed in reflection. If the desired effect is observed by means of back-illumination or the like, both parallel limiting plates consist of a transparent material. Examples of suitable transparent materials are glass plates, polycarbonate sheets and the like.

Particular interest has recently been paid to electrochromic displays in the form of mirrors or display elements. In electrochromic displays, a colour change of the electrochromic liquid takes place under the action of the electric field. Displays are therefore constructed in the form of flat chambers, in which the parallel limiting plates are made a transparent material with a light-transparent, electrically conductive coating, in particular an indium-tin oxide (ITO) coating, which is in contact with the electrochromic liquid. In the case of electrochromic mirrors, one of the coatings is in the form of a non-transparent, reflective, metallic layer.

Displays or mirrors of this type are disclosed in principle in U.S. Pat. No. 3,451,741, EP-A 240 226 and WO 94/23333. Preferred electrochromic liquids are described in the German patent applications 196 05 448, 196 05 441, 196 21 865 and 196 31 729.

In order to keep an electrochromic mirror or an electrochromic display functional in the long term, it is necessary to keep the electrochromic liquid away from contact with atmospheric oxygen and other compounds which are reactive with the electrochromically active substances and to prevent evaporation of constituents of the electrochromic liquid, in particular solvents, i.e. it is necessary to encapsulate the electrochromic liquid securely in the chamber. In addition, the chamber must be filled with the electrochromic liquid without gas bubbles, since gas bubbles restrict the use of such displays and mirrors. A further problem is contact of the electrochromic liquid with uncured components of the epoxy resin adhesive usually employed. The unreacted components of the adhesive react with the electrochromically active substance and possibly further components of the electrochromic liquid.

The multifarious problems associated with the production of the flat chamber and its filling have hitherto only been solved inadequately. Regarding the prior art, reference is made to U.S. Pat. No. 5,233,461, whose introduction cites a number of prior-art proposals for solving the problems and which itself discloses a further proposal.

SUMMARY OF THE INVENTION

The present invention relates to a flat chamber for filling with fluid media of the type mentioned at the outset, with the characterizing feature that at least one capillary is provided which runs parallel to the limiting plates, passes through the adhesive bead and is bonded thereto.

The external diameter of the capillary is smaller than the separation of the plates. Capillaries of this type can easily be produced from quartz and are commercially available in standardized form for use in high-pressure liquid chromatography. For example, for flat chambers having a plate separation of 0.2 mm, quartz capillaries from Seitz Chromatografie Produkte GmbH, Weiterstadt, Germany, with the Article Nos. SC 100 170 and SC 075 150 are suitable. These have external diameters of 0.17 mm and 0.15 mm respectively and internal diameters of 0.1 mm and 0.075 mm respectively.

DESCRIPTION OF THE PERFERRED EMBODIMENTS

Figure 1:
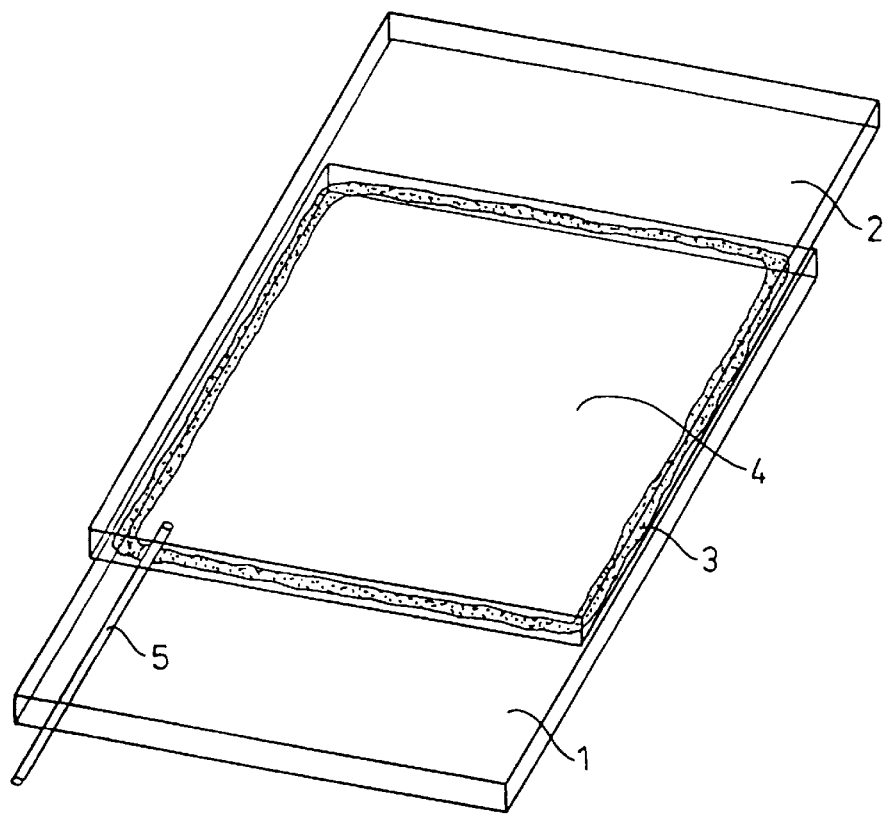
FIG. 1 illustrates a first flat chamber according to the invention.

In an example of a process for the production of the flat chamber, the two limiting plates are provided with a strip of adhesive along the bond line, the capillary is then placed transversely on top of the adhesive strip, and the two plates are then placed together and the adhesive cured with heating. In order to fix the plate separation, the adhesive can be mixed in a conventional manner with glass beads having a diameter which corresponds to the desired plate separation.

The capillary is preferably arranged in such a way that it projects somewhat beyond the adhesive bead to the inside, thus excluding the risk of blockage of the capillary by adhesive entering from the inside. The capillary preferably projects by at least 1 mm beyond the inside of the adhesive bead.

Depending on the method employed for filling the flat chamber, it may be advantageous to provide a plurality of capillaries. The flat chamber according to the invention particularly preferably has two capillaries which run parallel to the plates, pass through the adhesive bead and are bonded thereto.

In the case of a flat chamber having an essentially rectangular cross section, the capillary is preferably arranged in such a way that its opening to the chamber opens in the vicinity of a corner, in particular at a distance of from 1 to 2 mm from the inside of the bead at the chamber corner. In the case where two capillaries are provided, these preferably each open in one corner of the flat chamber, particularly preferably at two opposite corners.

After the chamber has been filled with the electrochromic liquid, the external opening of the capillary can be sealed in a simple manner with adhesive. Neither contact of the electrochromic liquid nor heating of the essentially punctiform bonding of the capillary entrance can adversely affect the electrochromic liquid. Any reactions between the adhesive and the electrochromic liquid take place merely at the essentially punctiform capillary inlet. There is no mixing with the electrochromic liquid present in the flat chamber, since any reaction products can only achieve access to the chamber by diffusion through the capillaries.

The flat chamber according to the invention can be filled in a manner known per se, for example, if only one capillary is present, by the known vacuum backfilling method. Furthermore, the chamber and a container holding the electrochromic liquid are introduced into a vacuum chamber, the vacuum chamber is evacuated, with the flat chamber being evacuated through the capillary at the same time, the capillary is subsequently dipped into the electrochromic liquid, and the evacuated container is then, if necessary, flooded with protective gas. The atmospheric pressure which builds up during this operation, possibly also superatmospheric pressure, above the liquid forces the latter into the evacuated chamber.

In the case where two capillaries are provided, the first capillary can be connected to a vacuum source via fittings and flange elements known from high-pressure liquid chromatography, and the other capillary can be connected to a container holding the electrochromic liquid. In this case, either the electrochromic liquid is "lifted" into the chamber by means of vacuum or alternatively, if the container for the electrochromic liquid is in the form of an injection syringe, is injected into the evacuated chamber. The capillary opening on the chamber side, via which the evacuation is carried out, should preferably be in the vicinity of the highest point of the chamber so that the residual volume after flooding of the capillary entrance is as small as possible. The pressure and size of the empty volume remaining determines the size of the gas bubble remaining in the chamber. If the volume of the gas bubble is sufficiently small, the bubble will dissolve in the electrochromic liquid.

In order to improve the dissolution capacity of the electrochromic liquid for dissolving the gas bubble remaining, the electrochromic liquid is preferably degassed by vacuum treatment before introduction into the chamber.

In the case of filling by vacuum backfilling, in which, naturally, gas is no longer removed from the cell during introduction of the electrochromic liquid, all the gas corresponding to the pressure in the evacuated cell remains in the cell.

A filling method which is preferred in accordance with the invention for the flat chamber therefore consists in re-evacuating the flat chamber after the vacuum backfilling, where the level of the capillary opening on the chamber side should be in the upper part of the chamber placed vertically. This causes electrochromic liquid to be conveyed out of the chamber to the level of this opening and then the gas volume is re-evacuated. If the chamber is then re-filled with electrochromic liquid by vacuum backfilling, the residual gas remaining in the chamber is reduced in accordance with the ratio between the total chamber volume and the vacuum volume of the second evacuation.

The invention is explained in greater detail below with reference to the attached drawings.

FIG. 1 shows a first flat chamber according to the invention which consists of two parallel limiting plates 1 and 2, the circumferential bead of cured adhesive 3 between the limiting plates, which is penetrated by the capillary 5 so that the flat chamber interior 4 can be filled via the capillary.

Figure 2:
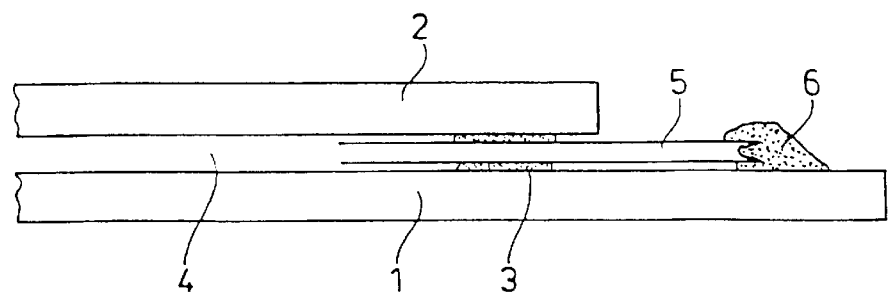
FIG. 2 illustrates details of a seal for an external capillary opening.

FIG. 2 shows the sealing 6 of the external capillary opening with the capillary end projecting outside the chamber shortened after filling by scoring and breaking off.

Figure 3:
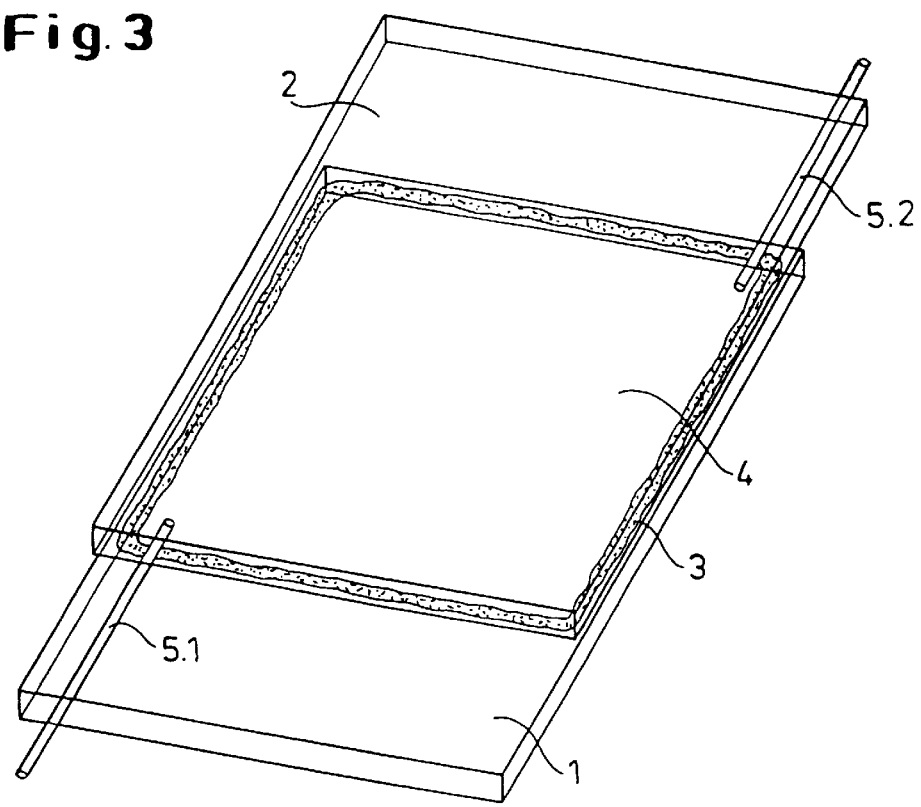
FIG. 3 illustrates a second flat chamber according to the invention.

FIG. 3 shows a chamber according to the invention which has two capillaries 5.1 and 5.2 which are diametrically opposite with respect to the chamber. After the chamber has been placed vertically, electrochromic liquid can be introduced through the first capillary (5.1) and the chamber can be evacuated through the other capillary (5.2).

Figure 4:
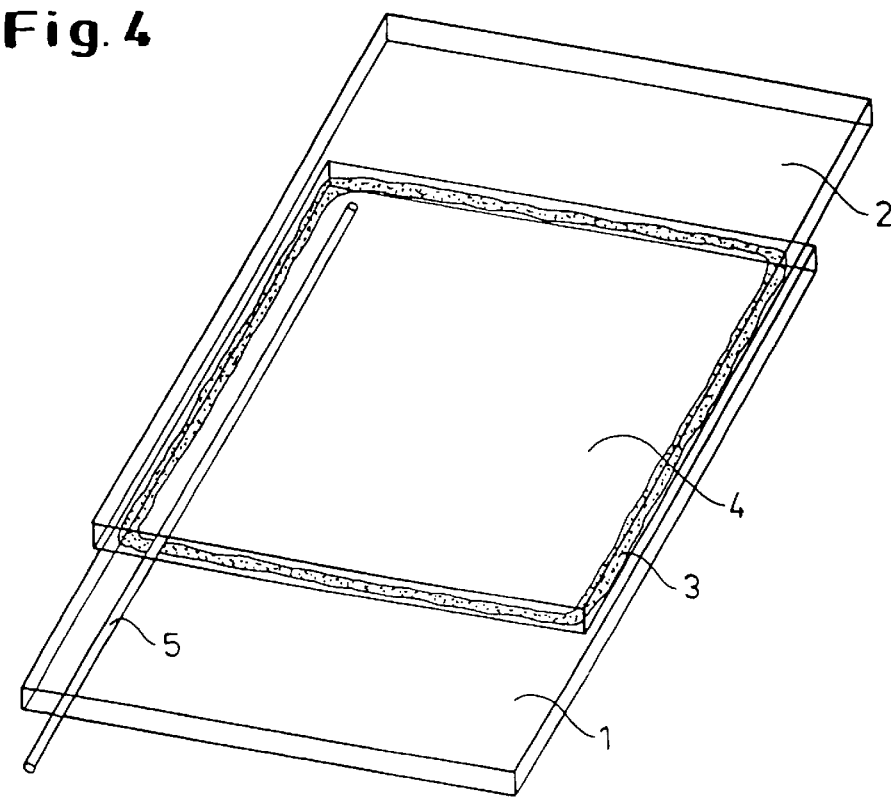
FIG. 4 illustrates another flat chamber according to the invention.

FIG. 4 shows a chamber according to the invention which is particularly suitable for the double vacuum backfilling described above. Here, the capillary 5 passes through virtually the entire side extension of the chamber 4. If the chamber is re-subjected to the vacuum after the first vacuum backfilling, with the capillary 5 essentially perpendicular to the opening to the outside, firstly the electrochromic liquid is drawn out of the chamber to the level of the capillary opening on the chamber side, and subsequently the gas space is evacuated via the capillary. Due to the second vacuum backfilling, considerably less gas accordingly remains in the chamber than in the case of only a single vacuum backfilling.

What is claimed is:

1. Flat chamber for filling with fluid media which is defined by two essentially parallel limiting plates and a circumferential bead of a cured, impermeable adhesive between the plates which bonds the plates to one another, having a single capillary which runs parallel to the plates, passes through the adhesive bead and is bonded thereto and passes through the chamber until just before the opposite bead.

2. Flat chamber according to claim 1, where the chamber has an essentially rectangular cross section, and said capillary passes through the bead in a corner.

3. Flat chamber for filling with an electrochromic liquid according to claim 1, where at least one of the plates consists of a transparent support which is provided on the inside with a transparent, electrically conductive coating, and the other plate is electrically conductive, at least on its inside, and where furthermore the electrically conductive coatings are provided with electrical contacts outside the chamber.

4. Flat chamber according to claim 3, where the other plate is a mirror.

* * * * *